United States Patent
Chen et al.

(10) Patent No.: US 8,190,936 B2
(45) Date of Patent: May 29, 2012

(54) METHOD FOR DETERMINING AND MAXIMIZING UNAVAILABILITY INTERVAL

(75) Inventors: Tuan Che Chen, Hsinchu (TW); Ying Yu Chen, Tainan (TW); Jyh-Cheng Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 820 days.

(21) Appl. No.: 12/194,045

(22) Filed: Aug. 19, 2008

(65) Prior Publication Data

US 2009/0199032 A1 Aug. 6, 2009

(30) Foreign Application Priority Data

Feb. 1, 2008 (TW) .............................. 97103891 A

(51) Int. Cl.
*G06F 1/00* (2006.01)
*G06F 1/26* (2006.01)
*G06F 1/32* (2006.01)
*G08C 17/00* (2006.01)

(52) U.S. Cl. ......... 713/323; 713/300; 713/320; 370/311

(58) Field of Classification Search ................... 370/311
See application file for complete search history.

(56) References Cited

U.S. PATENT DOCUMENTS

| | | | | |
|---|---|---|---|---|
| 6,144,656 A | * | 11/2000 | Kinnunen et al. | 370/347 |
| 7,369,815 B2 | * | 5/2008 | Kang et al. | 455/73 |
| 7,860,469 B2 | * | 12/2010 | Mohanty et al. | 455/127.5 |
| 7,991,436 B2 | * | 8/2011 | Yanover | 455/574 |

OTHER PUBLICATIONS

Office Action issued from Taiwan Patent Office on Jul. 27, 2011.
Chen, Ying-Yu, An Efficient Energy Saving Mechanism for IEEE 802.16e Wireless MANs, Jun. 2007.

* cited by examiner

*Primary Examiner* — Ji H Bae
(74) *Attorney, Agent, or Firm* — WPAT, P.C.; Anthony King

(57) ABSTRACT

The method for maximizing an unavailability interval includes the steps of initializing the starting frame number of each power saving class $f_i$ to 1 and adjusting $f_i$ to $f_i'$ when the least common multiple of $m_1, m_2, \ldots, m_{i-1}$ and $m_i$ is not relatively prime. The index i is an integer from 1 to t, $m_i$ is the sleep cycle of the $i^{th}$ power saving class, and $f_i'$ is an integer that maximizes common sleep windows of the i power saving classes. The common sleep windows of the t power saving classes are then set as the maximum unavailability interval of the wireless telecommunication device.

9 Claims, 10 Drawing Sheets

|   | 1 | 2 | 3 | 4 | 5 | 6 |
|---|---|---|---|---|---|---|
| 1 | 1 | 0 | 0 | 10 | 0 | 0 |
| 2 | 0 | 2 | 0 | 0 | 11 | 0 |
| 3 | 0 | 0 | 3 | 0 | 0 | 12 |
| 4 | 13 | 0 | 0 | 4 | 0 | 0 |
| 5 | 0 | 14 | 0 | 0 | 5 | 0 |
| 6 | 0 | 0 | 15 | 0 | 0 | 6 |
| 7 | 7 | 0 | 0 | 16 | 0 | 0 |
| 8 | 0 | 8 | 0 | 0 | 17 | 0 |
| 9 | 0 | 0 | 9 | 0 | 0 | 18 |

FIG. 4B

|   | 1 | 2 | 3 | 4 | 5 | 6 |
|---|---|---|---|---|---|---|
| 1 | 1 | 0 | 0 | 10 | 0 | 0 |
| 2 | 0 | 2 | 0 | 0 | 11 | 0 |
| 3 | 0 | 0 | 3 | 0 | 0 | 12 |
| 4 | 13 | 0 | 0 | 4 | 0 | 0 |
| 5 | 0 | 14 | 0 | 0 | 5 | 0 |
| 6 | 0 | 0 | 15 | 0 | 0 | 6 |
| 7 | 7 | 0 | 0 | 16 | 0 | 0 |
| 8 | 0 | 8 | 0 | 0 | 17 | 0 |
| 9 | 0 | 0 | 9 | 0 | 0 | 18 |

FIG. 5B

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | 1 | 0 | 21 | 0 | 5 | 0 | 25 | 0 | 9 | 0 | 29 | 0 | 13 | 0 | 33 | 0 | 17 | 0 |
| 2 | 0 | 2 | 0 | 22 | 0 | 6 | 0 | 26 | 0 | 10 | 0 | 30 | 0 | 14 | 0 | 34 | 0 | 18 |
| 3 | 19 | 0 | 3 | 0 | 23 | 0 | 7 | 0 | 27 | 0 | 11 | 0 | 31 | 0 | 15 | 0 | 35 | 0 |
| 4 | 0 | 20 | 0 | 4 | 0 | 24 | 0 | 8 | 0 | 28 | 0 | 12 | 0 | 32 | 0 | 16 | 0 | 36 |

FIG. 5C

METHOD FOR DETERMINING AND MAXIMIZING UNAVAILABILITY INTERVAL

BACKGROUND OF THE INVENTION

1. Field of the Invention

The invention relates to a power-saving technique, and more particularly, to a technique to control sleep windows in a wireless telecommunication device for reducing power consumption of a terminal device.

2. Description of the Related Art

IETEE standard 802.16 defines the wireless MAN™ air interface specification for wireless Metropolitan Area Networks (MANs). The standard heralds the entry of broadband wireless access as a major new tool in the effort to link homes and businesses to core telecommunications networks worldwide. The WiMAX Forum further proposed the WiMAX End-to-End Network Systems Architecture compatible with IEEE 802.16. Since the IEEE 802.16 is designed for wider coverage and broader bandwidth, it is viewed as one of the leading standards in $4^{th}$ generation communication systems.

In IEEE 802.16e, three power saving modes, Type I, Type II, and Type III, are defined. Each class is associated with unique parameters, activation/deactivation procedures, and data transmission mechanisms. When a power saving class is not activated, mobile stations (MSs) communicate with base stations (BSs) along schedules defined by BSs. When a power saving class is activated, MSs are put in sleep modes to conserve energy.

FIG. 1 shows exemplary timing charts of Type I and Type II power saving classes. Each rectangle represents an IEEE 802.16e MAC frame. In connection 720, frames 724-734 are operated in Type I sleep mode, and frames 722 and 736 are operated in normal mode. In sleep windows 724, 728 and 732, no transmission is permitted. In listen windows 726, 730 and 734, MS restarts the power of radio transceiver and checks if any transmission is required. If no transmission is required, the frame numbers of Type I sleep windows will double at next sleep cycle. If transmission is required, the sleep mode is deactivated and replaced by normal mode 736. Connection 740 shows Type II sleep mode. In Type II sleep mode, the length of sleep cycle 724, sleep windows 744 and listen windows 746 are fixed. Data can be transmitted during listen windows without terminating Type II sleep mode.

IEEE 802.16e further defines Unavailability Interval (UI) to indicate the condition that all connections are in sleep mode. During UI, no transmission is conducted between MSs and BSs, and MSs are allowed to turn radio transceiver for power conservation. Therefore, maximizing the duration of UI can decrease power consumption of a terminal device.

SUMMARY OF THE INVENTION

The method for maximizing an unavailability interval according to an embodiment of the invention includes the steps of initializing the starting frame number of each power saving class $f_i$ as 1 and adjusting $f_i$ to $f_i'$ when the least common multiple of $m_1, m_2, \ldots, m_{i-1}$ and $m_i$ are not relatively prime. The index i is an integer from 1 to t, $m_i$ is the sleep cycle of the $i^{th}$ power saving class, and $f_i'$ is an integer that maximizes common sleep windows of i power saving classes. The common sleep windows of the t power saving classes are then set as the maximum unavailability interval of the wireless telecommunication device.

The method for determining an unavailability interval according to an embodiment of the invention includes the steps of creating a matrix $M_{A,B}$, wherein the integer A is set as the least common multiple of $m_1, m_2, \ldots, M_{i-1}$, and an integer B is set as mi. The (x,y) element of the matrix $M_{A,B}$ is updated if a term has a remainder x when divided by A and has a remainder y when divided by B. A plurality of elements of the matrix $M_{A,B}$ are extracted according to a first sequence and a second sequence. The obtained elements are set as the frame numbers of the common sleep windows of the i power saving classes. The common sleep windows of the t power saving classes are then set as the maximum unavailability interval of the wireless telecommunication device.

BRIEF DESCRIPTION OF THE DRAWINGS

The invention will be described according to the appended drawings in which:

FIG. 4B shows an exemplary embodiment of updating the elements of the matrix $M_{A,B}$;

FIG. 5B shows an exemplary embodiment of extracting elements from the matrix $M_{A,B}$;

FIG. 5C shows an example in which when $f_3'$ is 2, the extracted elements are determined by {4, 7, 8, 13, 14, 15, 16} and {3, 4, 1};

PREFERRED EMBODIMENT OF THE PRESENT INVENTION

Figure 2:
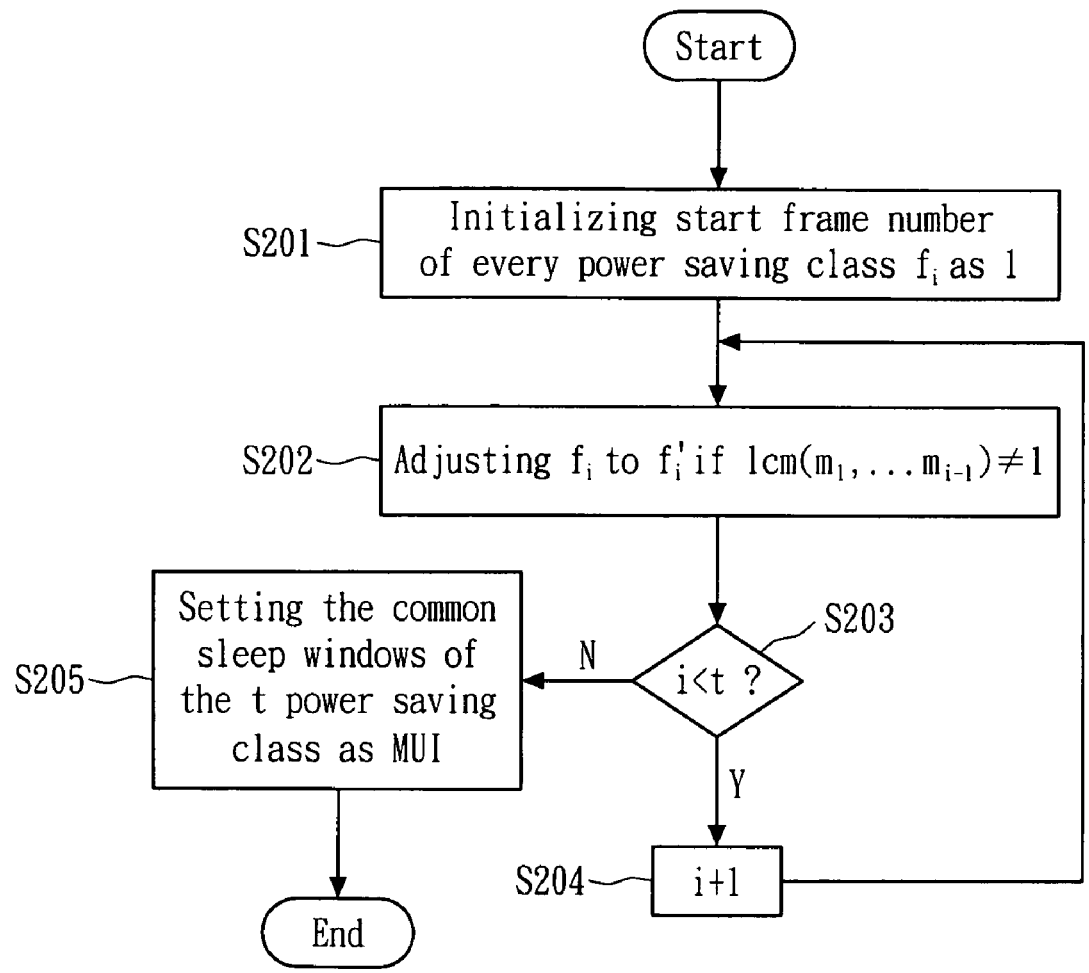
FIG. 2 shows an embodiment of maximizing an unavailability interval of t power saving classes.

FIG. 2 shows an embodiment of maximizing an unavailability interval of t power saving classes 200. In step S201, a set of t starting frame numbers $(f_1, f_2, \ldots f_i, \ldots f_t)$ is initialized as $(1,1,\ldots 1,\ldots 1)$, wherein $f_i$ is the starting frame number of the $i^{th}$ power saving class. The value of $f_i$ is an integer between 1 and $m_i$, wherein $m_i$ is a sleep cycle of the $i^{th}$ power saving class. In steps S202-S204, the value fi is adjusted to $f_i'$ if the least common multiple of $m_1, m_2, \ldots, m_{i-1}$ and $m_i$ is not relatively prime. $f_i'$ is an integer that maximizes common sleep windows of the i power saving classes. In step S205, the common sleep windows of the t power saving classes are set as the maximum unavailability interval of a wireless telecommunication device.

Figure 3:
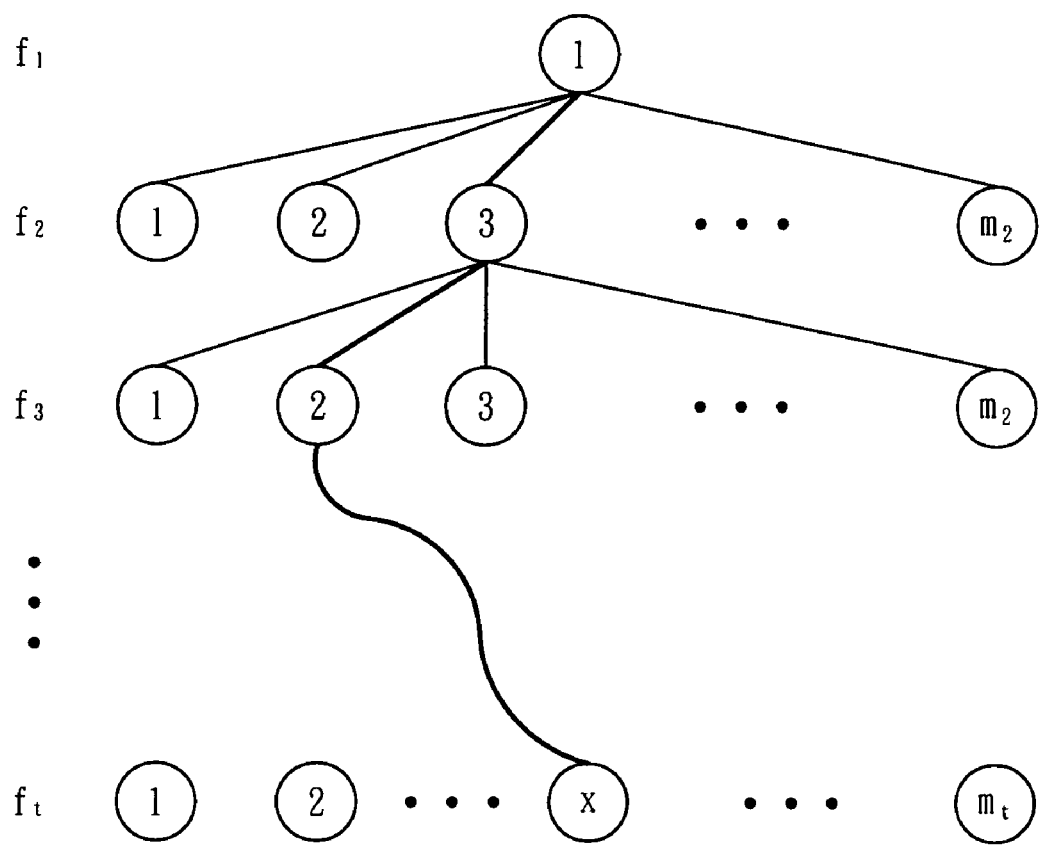
FIG. 3 shows an example of the determination of $f_i'$.

FIG. 3 shows an example of the determination of $f_i'$. After step S201, $f_1$ is set as 1. In the first S202-S204 iteration, $f_2'$ is determined by selecting a maximum common sleep windows among every set of $(f_1, f_2)$, which are (1, 1), (1,2), (1,3), \ldots, $(1, m_2)$. In the embodiment of the invention, the value of f2' is 3. The determination of $f_3', f_4', \ldots, f_t'$ are similar to the determination of $f_2'$, and hence are skipped herein. In general, the $i^{th}$ starting frame number $f_i$ is determined based on (i−1) power saving classes. Though the procedure of adjusting $f_i'$ only guarantees a relatively optimum solution instead of an absolutely optimum solution, experimental results show the relatively optimum solution performs almost as well as the absolutely optimum solution.

Figure 4A:
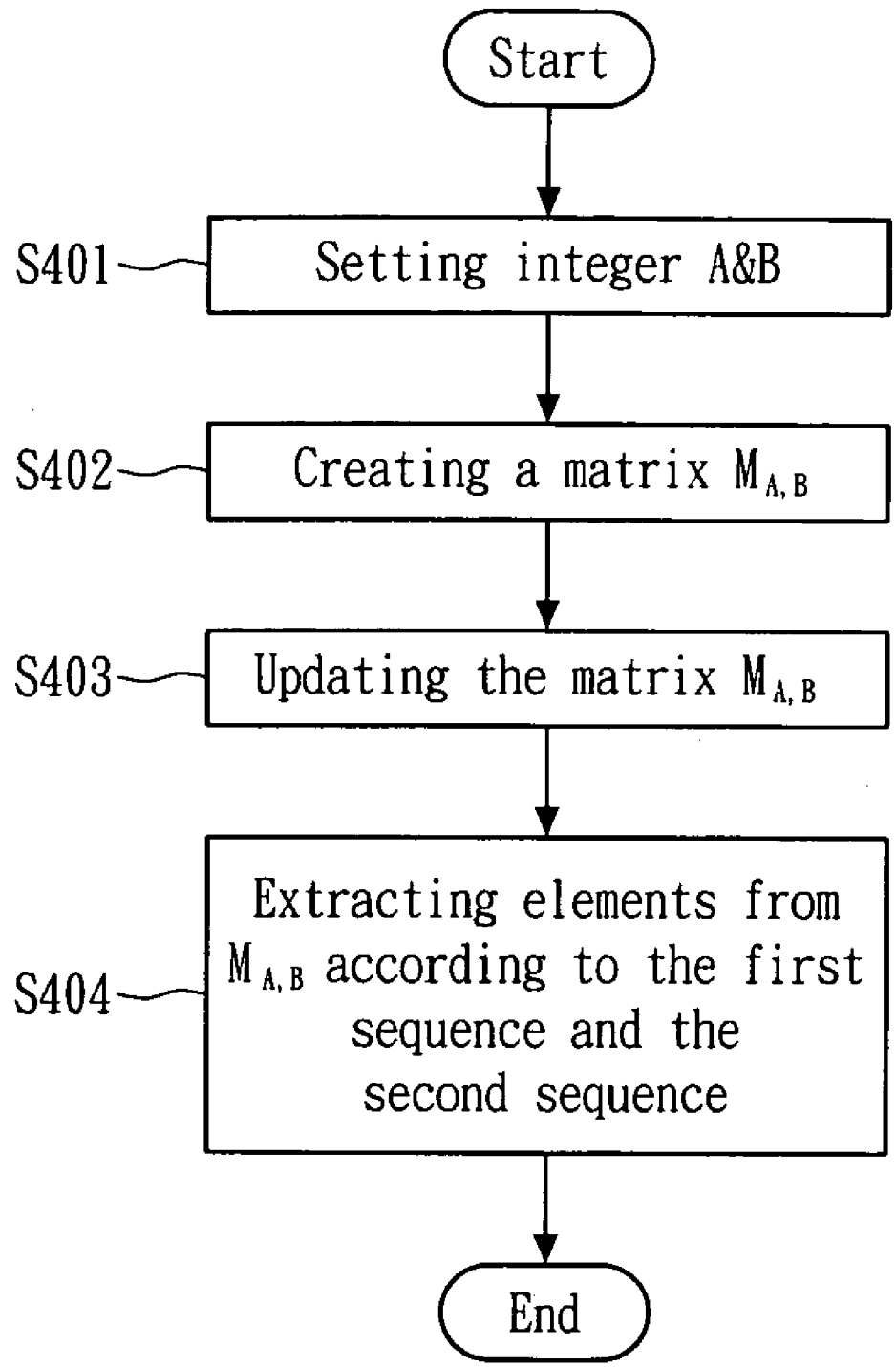
FIG. 4A shows an embodiment of step S202.

FIG. 4A shows an embodiment of step S202. In step S401, an integer A is set as the least common multiple of $m_1$, $m_2, \ldots, m_{i-1}$, and an integer B is set as $m_i$. A matrix $M_{A,B}$, having A×B elements, is created in step S402, wherein all elements in matrix $M_{A,B}$ are initialized as 0s. In step S403, the element of the matrix $M_{A,B}$ is updated. If a term $U_1$ has a remainder x when divided by A and has a remainder y when divided by B, the (x,y) element of the matrix $M_{A,B}$ is changed to the term $U_1$. If a term $U_2$ of the arithmetic sequence is evenly divisible by A and has the remainder y when divided by B, the (A,y) element of the matrix $M_{A,B}$ is changed to $U_2$. If a term $U_3$ of the arithmetic sequence has the remainder x when divided by A and is evenly divisible by B, the (x,B) element of the matrix $M_{A,B}$ is changed to $U_3$.

FIG. 4B shows an exemplary embodiment of updating the elements of the matrix $M_{A,B}$. In FIG. 4B, A is set as 9, B is set as 6, and (x,y) (9,y) (x,6) elements are updated to $U_1$, $U_2$ and $U_3$, respectively. In step S404, a plurality of elements are extracted from the matrix $M_{A,B}$ according to a first sequence and a second sequence. The first sequence comprises the frame numbers of the common sleep windows of the $1^{st}$, $2^{nd}, \ldots, (i-1)^{th}$ power saving classes, and the second sequence comprises the frame numbers of the $i^{th}$ power saving classes. The extracted elements are assembled and set as a subsequent sequence, which indicates the common sleep windows of the $1^{st}, 2^{nd}, \ldots,$ and $i^{th}$ power saving classes.

Figure 5A:
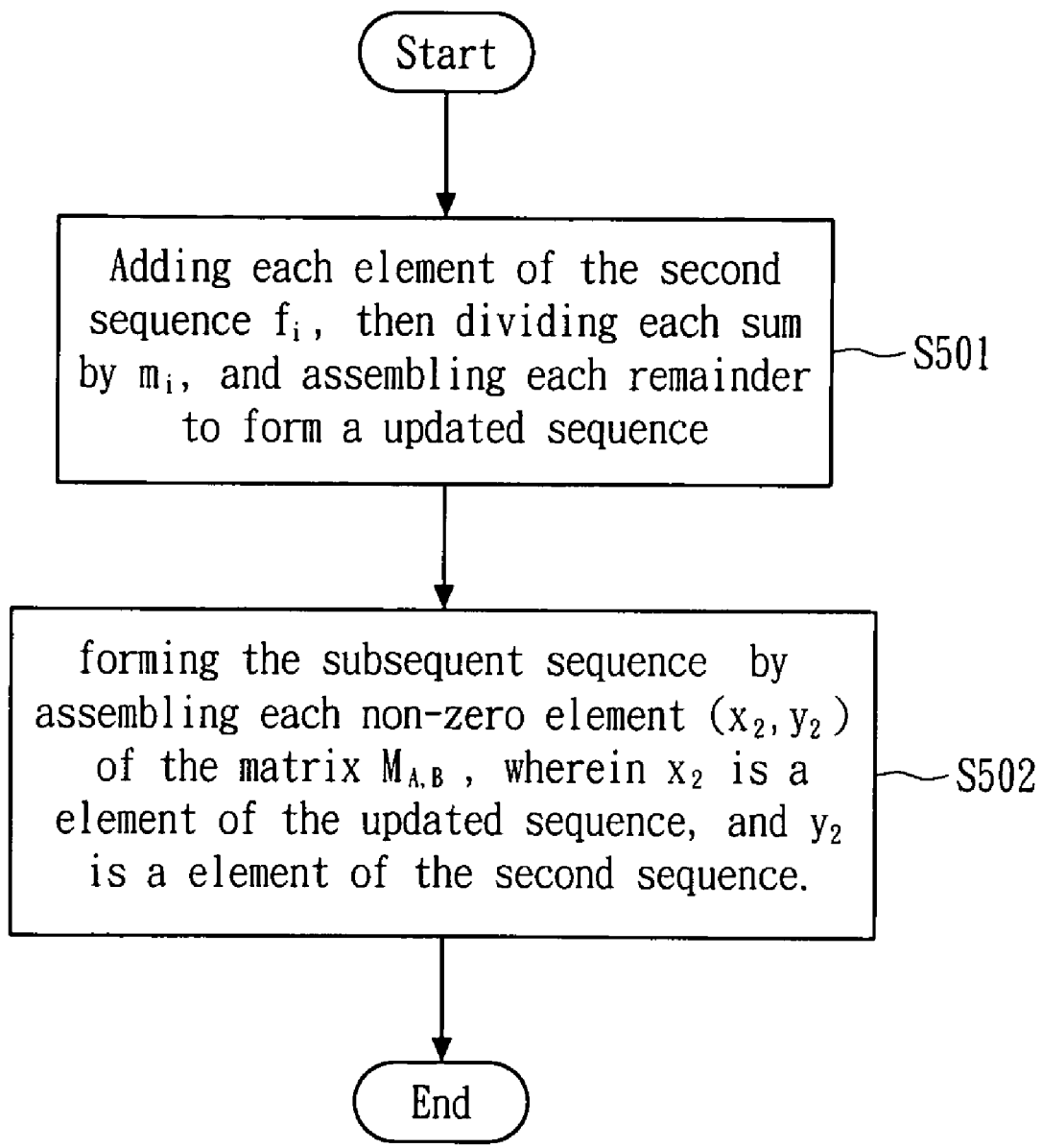
FIG. 5A shows an embodiment of extracting the plurality of elements of the matrix $M_{A,B}$ according to the first sequence and the second sequence.

FIG. 5A shows an embodiment of extracting the plurality of elements of the matrix $M_{A,B}$ according to the first sequence and the second sequence (step S404). In steps S501-S502, each element of the second sequence sums $f_i$, and each sum is then divided by $m_i$. The remainder of each division is assembled to form an updated sequence. In step S503, the non-zero elements (x2, y2) of the matrix $M_{A,B}$ are extracted to form the subsequent sequence, wherein x2 is an element of the updated sequence, and y2 is an element of the second sequence. For example, FIG. 5B shows an exemplary embodiment of extracting elements from the matrix $M_{A,B}$. The first sequence is the sleep window {1,2,3,4} of a power saving class. The second sequence is the sleep window of another power saving class which the start frame number $f_2'$ is 3, according to the example in FIG. 3. Thus the second sequence is $\{(1+3)_{mod9}, (2+3)_{mod9}, (3+3)_{mod9}, (4+3)_{mod9}, (5+3)_{mod9}\}$. The extracted elements {4, 7, 8, 13, 14, 15, 16} are the non-zero elements in the union of sub-matrix 52B and sub-matrix 54B. The extracted elements are memorized and are used as first sequence when determining f3'. FIG. 5C shows an example in which when $f_3'$ is 2, the extracted elements are determined by {4,7,8,13,14,15,16} and {3,4,1}.

Figure 6:
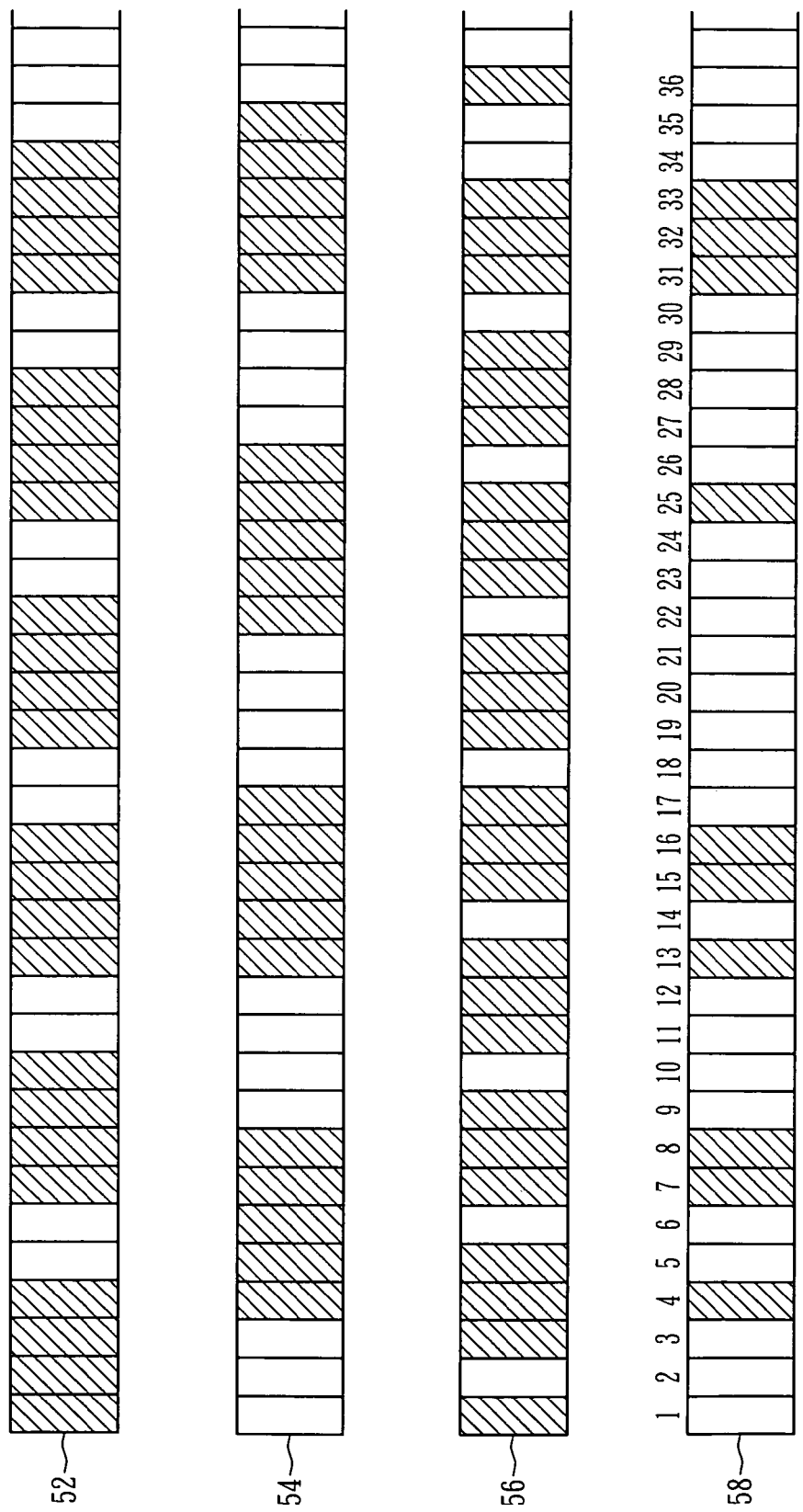
FIG. 6 shows the time chart of the exemplary embodiment of maximized unavailability interval.
Figure 7:
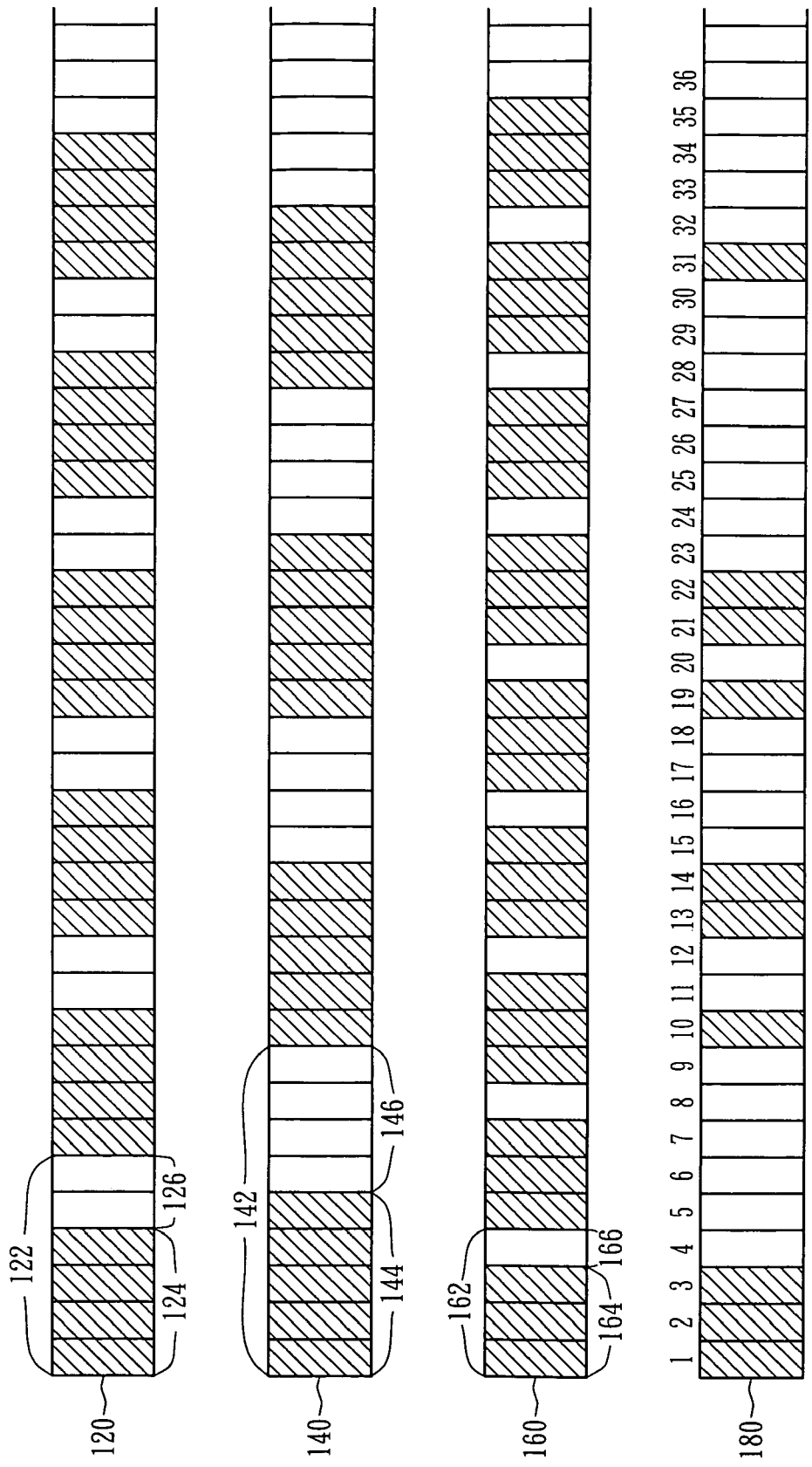
FIG. 7 shows the time chart of three un-processed type II power saving classes.

FIG. 6 shows the time chart of the exemplary embodiment of the maximized unavailability interval. Power saving classes 52, 54, and 56 each have sleep cycles ($m_1$, $m_2$ and $m_3$) 6, 9, and 4, and sleep windows 4, 5, and, 3, respectively. The start frame numbers $f_1$, $f_2$, $f_3$ are 1, 3, 2, and the frame numbers are 4, 7, 8, 13, 15, 25, 31, 32, and 33. Compared with the timing chart shown in FIG. 7, the unavailability interval is not yet maximized, and the frames of the unavailability interval are 10 frames, fewer than the maximized case by almost 10%.

The method for maximizing and determining unavailability intervals is based on determining the optimal start frame number of power saving classes. In other words, by adjusting the activation time of each Type II power saving class, the unavailability interval can be optimized without degrading the quality of service.

Figure 1:
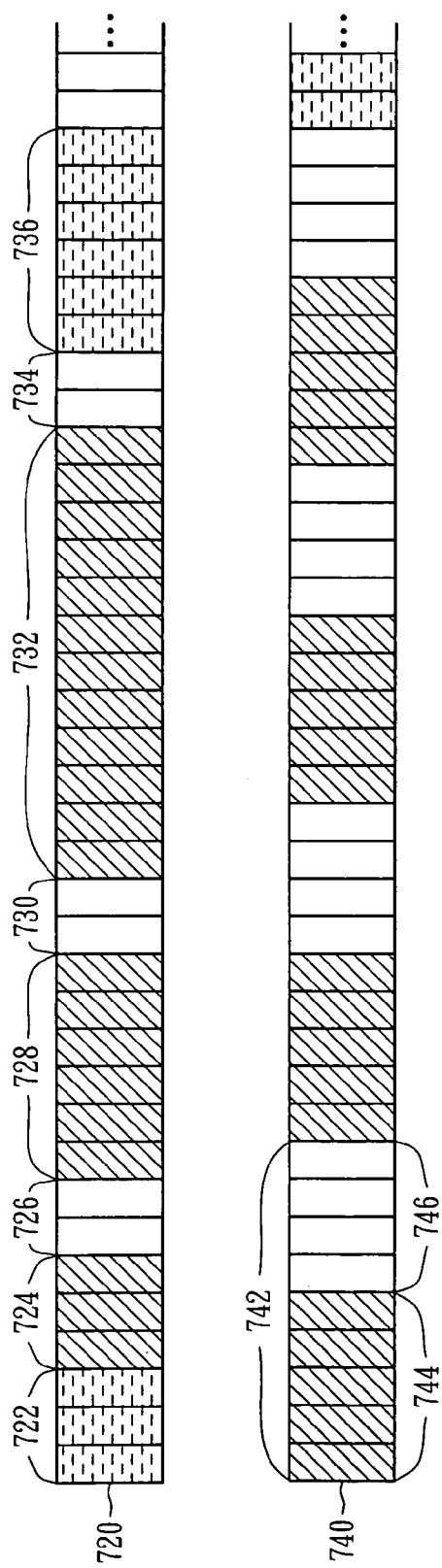
FIG. 1 shows exemplary timing charts of Type I and Type II power saving class.

Other approaches, such as the Chinese Remainder Theorem, can be applied for determining the unavailability interval. For example, determining the 3 power saving classes 52, 54, and 56 shown in FIG. 1 can be transformed as finding integers that satisfy the following three conditions. First, integers having a remainder of any one of 1 to 4 when divided by 6. Second, integers having a remainder of any one of 1 to 5 when divided by 9. Third, integers having a remainder of any one of 1 to 3 when divided by 4.

Furthermore, the maximum unavailability interval can be determined by exhaustively finding the unavailability interval of each combination of possible start frame numbers.

The above-described embodiments of the present invention are intended to be illustrative only. Numerous alternative embodiments may be devised by persons skilled in the art without departing from the scope of the following claims.

What is claimed is:

1. A method for maximizing an unavailability interval when t power saving classes are activated on a wireless telecommunication device, comprising the steps of:
   a) initializing the starting frame number of each power saving class $f_i$ as 1;
   b) adjusting $f_i$ to $f_i'$ if the least common multiple of $m_1$, $m_2, \ldots, m_{-1}$ is not relatively prime with $m_i$, wherein i is an integer from 1 to t, $m_i$ is a sleep cycle of the $i^{th}$ power saving class, and $f_i'$ is an integer that maximizes common sleep windows of the i power saving classes; and
   c) setting the common sleep windows of the t power saving classes as the maximum unavailability interval of the wireless telecommunication device.

2. The method of claim 1, wherein the step b) further comprises the steps of:
   setting the least common multiple of $m_1, m_2, \ldots, m_{i-1}$ to A, and setting $m_i$ as B;
   creating a matrix $M_{A,B}$ having A×B elements in accordance with an arithmetic sequence, wherein all elements in matrix $M_{A,B}$ are initialized as zero;
   updating an element at coordinate (x,y) of the matrix $M_{A,B}$ if a number has a remainder x when divided by A and has a remainder y when divided by B;
   updating an element at coordinate (A,y) of the matrix $M_{A,B}$ if a term of the arithmetic sequence is evenly divisible by A and has the remainder y when divided by B;
   updating an element at coordinate (x,B) of the matrix $M_{A,B}$ if a term of the arithmetic sequence has the remainder x when divided by A and is evenly divisible by B;
   obtaining a first sequence and a second sequence, wherein the first sequence comprises the frame numbers of the common sleep windows of the $1^{st}, 2^{nd}, \ldots, (i-1)^{th}$ power saving classes, and the second sequence comprises the frame numbers of the $i^{th}$ power saving classes;
   extracting a plurality of elements of the matrix $M_{A,B}$ according to the first sequence and the second sequence, and setting the obtained elements as the frame numbers of the common sleep windows of the $1^{st}, 2^{nd}, \ldots, i^{th}$ power saving classes; and
   setting the obtained elements as a subsequent sequence, and setting the numbers of the obtained elements as the common sleep windows of the $1^{st}, 2^{nd}, \ldots, i^{th}$ power saving classes.

3. The method of claim 2, wherein the extracting step further comprises:
   adding each element of the second sequence $f_i$, dividing each sum by $m_i$, and assembling each remainder to form an updated sequence; and
   forming a subsequent sequence by assembling each non-zero element at coordinate $(x_2, y_2)$ of the matrix $M_{A,B}$, wherein $x_2$ is an element of the updated sequence, and $y_2$ is an element of the second sequence.

4. The method of claim 1, wherein the step a) further comprises setting $f_1$ as 1.

5. The method of claim 1, wherein the power saving classes are Type II, and are compatible with IEEE 802.16 standard.

6. A method for determining an unavailability interval when t power saving classes are activated on a wireless telecommunication device comprising the steps of:

setting an integer A as the least common multiple of $m_1, m_2, \ldots, M_{i-1}$, and setting an integer B as $m_i$, where $m_i$ is a sleep cycle of the $i^{th}$ power saving class, and i is an integer ranging from 1 to t;

creating a matrix $M_{A,B}$ having A×B elements, wherein all elements in matrix $M_{A,B}$ are initialized as zero;

updating an element at coordinate (x,y) of the matrix $M_{A,B}$ if a term of an arithmetic sequence has a remainder x when divided by A and has a remainder y when divided by B, wherein a common difference of the arithmetic sequence is 1, the first term of the arithmetic sequence is 1, and the last term of the arithmetic sequence is the least common multiple of A and B;

updating an element at coordinate (A,y) of the matrix $M_{A,B}$ if a term of the arithmetic sequence is evenly divisible by A and has the remainder y when divided by B;

updating an element at coordinate (x,B) of the matrix $M_{A,B}$ if a term of the arithmetic sequence has the remainder x when divided by A and is evenly divisible by B;

obtaining a first sequence and a second sequence, wherein the first sequence comprises the frame numbers of the common sleep windows of the $1^{st}, 2^{nd}, \ldots, (i-1)^{th}$ power saving classes, and the second sequence comprises the frame numbers of the $i^{th}$ power saving classes;

extracting a plurality of elements of the matrix $M_{A,B}$ according to the first sequence and the second sequence, and setting the obtained elements as the frame numbers of the common sleep windows of the $1^{st}, 2^{nd}, \ldots, i^{th}$ power saving classes;

repeating the above steps until the frame numbers of the common sleep windows of the $1^{st}, 2^{nd}, \ldots, i^{th}, \ldots, t^{th}$ power saving classes are obtained; and setting the frame numbers of the common sleep windows of the $1^{st}, 2^{nd}, \ldots, i^{th}, \ldots, t^{th}$ power saving classes as the unavailability interval of the t power saving class.

7. The method of claim 6, wherein the power saving classes are Type II, and are compatible with IEEE 802.16 standard.

8. A method for determining an unavailability interval when t power saving classes are activated on a wireless telecommunication device, comprising the steps of:

obtaining the sleep cycles of t power saving classes $(m_1, m_2, \ldots, m_t)$, wherein sleep window length of each power saving class are noted as $(s_1, s_2, \ldots, s_t)$;

finding integers having a remainder of any one of 1 to $s_i$ when divided by $m_i$ by applying a Chinese Remainder Theorem, wherein i ranges from 1 to t;

setting the number of the obtained elements as the common sleep windows of the $1^{st}$ to $i^{th}$ power saving classes, increasing the index i by 1 and repeating the above steps until the index i reach its maximum t; and setting the common sleep windows of the t power saving classes as the maximum unavailability interval of the wireless telecommunication device.

9. The method of claim 8, wherein the power saving classes are Type II and are compatible with IEEE 802.16 standard.

* * * * *